A. V. PETTMAN.
ROTARY CULTIVATOR.
APPLICATION FILED APR. 4, 1919.

1,371,571.  Patented Mar. 15, 1921.

Inventor
Albert Vinten Pettman
by Laurence Langner
Attorney

UNITED STATES PATENT OFFICE.

ALBERT VINTEN PETTMAN, OF WAIMAMAKU HOKIANGA, NEW ZEALAND.

ROTARY CULTIVATOR.

1,371,571.          Specification of Letters Patent.          Patented Mar. 15, 1921.

Application filed April 4, 1919. Serial No. 287,473.

*To all whom it may concern:*

Be it known that I, ALBERT VINTEN PETTMAN, a subject of His Majesty the King of the United Kingdom of Great Britain and Ireland, resident of Waimamaku Hokianga, in the Provincial District of Auckland and Dominion of New Zealand, have invented a new and useful Improvement in Rotary Cultivators, of which the following is a specification.

According to this invention the cultivator comprises a frame mounted on wheels and is provided preferably with its own means of propulsion such as an internal combustion engine, the other necessary parts such as change speed gear, brakes, clutches and the like being also provided in any known suitable form.

The front wheels are mounted on a power driven axle and are provided with mechanism controlled by a steering wheel situated convenient to the operator's seat to enable the apparatus to be steered and worked in the desired direction.

The means for disintegrating or pulverizing the soil comprise blades shaped somewhat similarly to plow shares and mold boards, said blades being secured around the circumferences of disks keyed or otherwise secured on a rear cross shaft carried on the frame said rear shaft being driven from an intermediate shaft operated from the engine via a clutch and gear box and the intermediate shaft transmits rotation to the front wheels through suitable differential or balance gear and other gearing the ratio of gearing between said intermediate shaft and the front wheels being such that the front wheels at all times rotate at a slower speed than the shaft carrying the soil disintegrating or pulverizing means, in order that the disintegration or pulverizing of the soil may be effected. Means are provided attached to the running wheels (other than the front wheels) whereby the height of the frame from the ground can be varied as desired in order that the depth at which the cultivator blades work may be determined to suit requirements.

Means are also provided whereby the front portion of the apparatus can be disconnected from the rear portion and be used as a tractor for hauling purposes.

The invention will be more particularly described with reference to the accompanying drawing in which—

Figure 1:
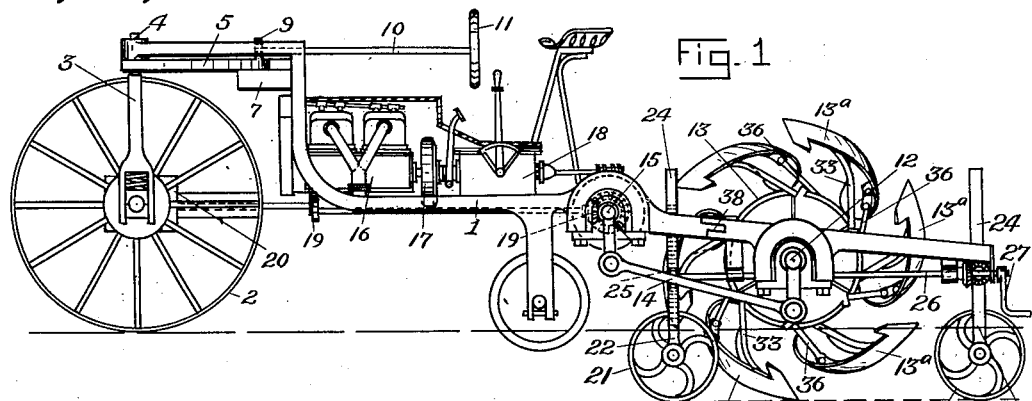
Figure 1 is a general elevation of the apparatus and Fig. 2 a general plan view of same.
Figure 2:
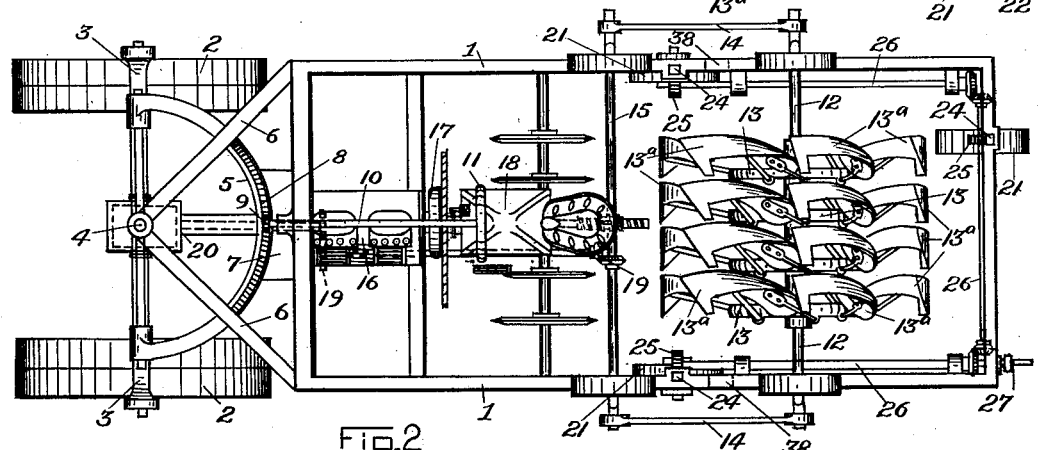

The frame 1 is mounted on wheels, the front wheels 2 being mounted in a fork 3 pivoted to the frame 1 at 4. A quadrant 5 extending rearward from the upper portion of the fork works between the converging portions 6 of the frame 1 and a projection 7, thereby insuring vertical rigidity of the fork, while permitting it to revolve about the pivot 4.

On the quadrant 5 is a rack 8, with which gears a pinion 9, mounted on the end of a rod 10, the rear end of which carries a steering wheel 11, so that by operating the latter the front wheels can be turned to cause the machine to run in the direction required.

Toward the rear of the frame 1, is a cross shaft 12, on which are keyed or otherwise rigidly mounted disks 13 each carrying a number of cultivator blades 13ª secured around its circumference, said shaft 12 being driven through connecting rods and cranks 14 from shaft 15 which is operated from the engine 16 via a clutch 7 and gear box 18.

The front wheels 2 are driven from the shaft 15 through gearing 19 and differential or balance gear 20, the gearing between said shaft 15 and the wheels 2 being so arranged that the latter never rotate at a speed equal to or greater than that of the shaft 12 in order that the cultivator blades 13ª rotated thereby may effect the breaking up and pulverizing of the soil by rotating at a speed greater than the speed at which the machine travels.

In order that the cultivator blades can be caused to work at the depth required the running wheels 21 are mounted in the lower forked ends 22 of vertical racks 24, the latter passing through squared openings in the frame 1. Pinions 25 on shaft 26 mesh with the racks 24, and may all be simultaneously operated to raise or lower the frame 1, by the rotation of the crank handle 27.

Figure 3:
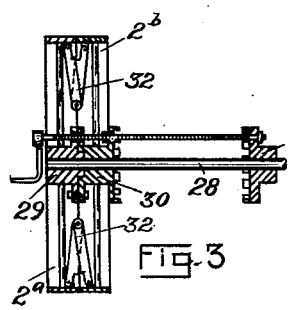
Fig. 3 illustrates by means of a sectional view how the front wheels are made extensible.
Figure 4:
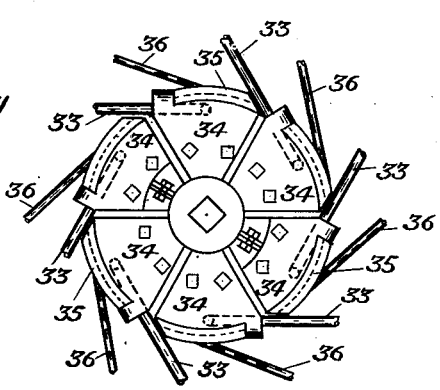
Figs. 4 and 5 are detail views showing the method of securing the cultivator blades to the disks.
Figure 5:
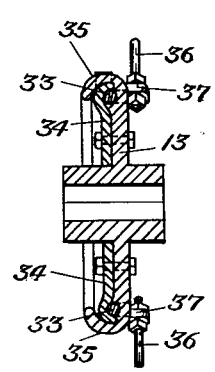

When the machine is working on soft ground and in order to prevent the wheels 2 sinking therein, the latter are made extensible. This is done by forming each wheel in two portions (Fig. 3) the outer portion $2^a$ being a fixture on the shaft 28 and the portion $2^b$ slidable thereon. The hub 30 of the portion $2^b$ is adapted to be bolted to the hub 29 of the portion $2^a$ when the wheel is collapsed, and when the wheel is extended the hub 30 is bolted or otherwise secured to a flange 31 a fixture on the shaft 28 at the limit of the wheel's extension.

Bars 32 hinged together connect the rims of the portions $2^a$ and $2^b$ and when the wheel is extended form a series of horizontal bars around the rims between the two portions. When the wheel is collapsed the bars 32 lie between the wheel spokes and the rims of the two portions $2^a$ $2^b$ are side by side.

To enable the machine to be used as a tractor for hauling purposes, the frame is preferably jointed at 38 (Fig. 1) and by disconnecting the rear portion of the frame from the front portion at the point mentioned and detaching the connecting rods 14, the fore part with the means of propulsion thereon can be employed as above indicated.

The method of securing the cultivator blades $13^a$ to the disk 13 consists of welding or otherwise fastening the front of the blade $13^a$ to the disk 13 at 33 at an angle to circumference, and securing a rod 34 to the top of the blade $13^a$ of the disk 13, said blades $13^a$ slope back from the direction of motion of the disk 13. A section is cut out of the disks at 36 to facilitate running of the disk 13.

What I desire to claim and secure by Letters Patent is:—

1. In a rotary cultivator, the combination of a frame; a shaft mounted in the rear of said frame; disks mounted on said shaft; ground working tools carried by the disks; front wheels; means for steering the front wheels; an engine mounted on the frame; a power shaft operated by said engine; gearing between the power shaft and the front wheels whereby the front wheels cause the advancement of the cultivator forwardly over the ground; operating connections between the power shaft and the shaft carrying the ground working tools for rotating said shaft at a higher rate of speed than the forward speed of the machine; a plurality of guiding and supporting wheels carried by the frame; and means for simultaneously adjusting the position of said rollers relatively to the ground.

2. In a rotary cultivator, the combination of a frame; a shaft mounted in the rear of said frame; ground working tools supported by said shaft and adapted to be rotated with the rotation of the shaft; front wheels, means for steering the front wheels; an engine mounted on said frame; a power shaft operated by said engine; gearing between the power shaft and the front steering wheels whereby the front wheels cause the advancement of the machine over the ground; an arm secured to the power shaft; a pitman connected to said arm; and an arm secured to the shaft carrying the ground working tools and connected to said pitman, said arm, pitman and arm coöperating to rotate the shaft carrying the ground working tools with the rotation of the power shaft.

ALBERT VINTEN PETTMAN.

Witness:
ERNEST WILFRED BOYCE CAREY.